United States Patent
Fowler et al.

(10) Patent No.: US 7,389,636 B2
(45) Date of Patent: Jun. 24, 2008

(54) BOOSTER ROCKET ENGINE USING GASEOUS HYDROCARBON IN CATALYTICALLY ENHANCED GAS GENERATOR CYCLE

(75) Inventors: Robert B. Fowler, Jupiter, FL (US); Claude R. Joyner, North Palm Beach, FL (US)

(73) Assignee: United Technologies Corporation, Hartford, CT (US)

( * ) Notice: Subject to any disclaimer, the term of this patent is extended or adjusted under 35 U.S.C. 154(b) by 447 days.

(21) Appl. No.: 11/175,671

(22) Filed: Jul. 6, 2005

(65) Prior Publication Data

US 2007/0006568 A1   Jan. 11, 2007

(51) Int. Cl.
*F02K 9/42* (2006.01)
*F02K 9/48* (2006.01)
*F02K 9/68* (2006.01)

(52) U.S. Cl. .............................. 60/204; 60/258; 60/259; 60/260; 60/267

(58) Field of Classification Search ........... 60/257–260, 60/267, 204
See application file for complete search history.

(56) References Cited

U.S. PATENT DOCUMENTS

| | | | | |
|---|---|---|---|---|
| 2,949,007 A * | 8/1960 | Aldrich et al. | ................. | 60/259 |
| 3,062,004 A * | 11/1962 | Dooley et al. | .................. | 60/267 |
| 3,149,460 A * | 9/1964 | La Rocca | ...................... | 60/260 |
| 3,283,508 A * | 11/1966 | Schulze | ........................ | 60/223 |
| 4,589,253 A * | 5/1986 | Wagner | ........................ | 60/204 |
| 4,841,723 A * | 6/1989 | Lau et al. | ....................... | 60/204 |
| 4,879,874 A * | 11/1989 | Koyari et al. | .................. | 60/259 |
| 4,998,410 A * | 3/1991 | Martinez-Leon et al. | ...... | 60/259 |
| 5,873,241 A * | 2/1999 | Foust | ........................... | 60/259 |
| 6,226,980 B1 * | 5/2001 | Katorgin et al. | ............... | 60/258 |
| 6,244,040 B1 * | 6/2001 | Adzhian et al. | ............... | 60/258 |
| 6,470,670 B2 * | 10/2002 | Maeding | ....................... | 60/259 |

* cited by examiner

*Primary Examiner*—Ted Kim
(74) *Attorney, Agent, or Firm*—Bachman & LaPointe, P.C.

(57) ABSTRACT

A process and a system for delivering a propellant combination to a rocket engine is described. The process comprises the steps of providing a flow of a hydrocarbon propellant fuel, raising the pressure of the hydrocarbon propellant fuel, cracking the hydrocarbon propellant fuel in a cracker, introducing the cracked hydrocarbon propellant fuel into a combustion chamber of the rocket engine and introducing an oxidizer into the combustion chamber. A system for performing the process is also described.

30 Claims, 3 Drawing Sheets

BOOSTER ROCKET ENGINE USING GASEOUS HYDROCARBON IN CATALYTICALLY ENHANCED GAS GENERATOR CYCLE

BACKGROUND OF THE INVENTION (1) Field of the Invention

The present invention is directed to a rocket engine, such as a booster rocket engine, using gaseous hydrocarbon in a catalytically enhanced gas generator cycle.

(2) Prior Art

A major issue with a LOX/kerosene propellant combination in high thrust rocket engine applications is instability. Pressure fluctuations in the combustion chamber have large enough values to cause harm to the structure are what is referred to as instability. Gas dynamic driven pressure variations that are driven by atomization and chemical instabilities at particular frequencies are the source of instability issues. These vibrations are usually high frequency (1000 Hz or higher) and can be very damaging.

During the combustion process, liquid fuel (kerosene) must be vaporized and cracked into its subcomponents in order to combust and this vaporization time that the kerosene droplet needs is one of the key factors in the kerosene instability issue. As the droplets enter the combustion zone, the radiant energy causes the droplets to vaporize faster and the combustion front moves closer to the faceplate. However, the faceplate is cool so that the droplet size increases and the flame front moves back down. Since the combustion causes a sharp pressure increase, a pressure wave forms. These form axial waves to set up in the chamber. The larger the chamber diameter, the more the chances of an instability occurring.

SUMMARY OF THE INVENTION

Therefore, it is an object of the present invention to provide a process and a system for delivering a hydrocarbon/oxidizer propellant combination to a rocket engine which avoids large chamber instability issues.

The foregoing object is attained by the process and the system of the present invention.

In accordance with the present invention, a process for delivering a propellant combination to a rocket engine is provided. The process broadly comprises the steps of providing a flow of a hydrocarbon propellant fuel, raising the pressure of the hydrocarbon propellant fuel, cracking the hydrocarbon propellant fuel in a cracker, introducing the cracked hydrocarbon propellant fuel into a combustion chamber of the rocket engine, and introducing an oxidizer into the combustion chamber.

Further, in accordance with the present invention, a system for delivering a propellant combination to a rocket engine is provided. The system broadly comprises means for providing a flow of a hydrocarbon propellant fuel, means for raising the pressure of the hydrocarbon propellant fuel, a cracker for cracking the hydrocarbon propellant fuel, means for introducing the cracked hydrocarbon propellant fuel into a combustion chamber of the rocket engine, and means for introducing an oxidizer into the combustion chamber.

Other details of the booster rocket engine using gaseous hydrocarbon in a catalytically enhanced gas generator cycle, as well as other objects and advantages attendant thereto, are set forth in the following detailed description and the accompanying drawings wherein like reference numerals depict like elements.

DETAILED DESCRIPTION OF THE PREFERRED EMBODIMENT(S)

The present invention solves large chamber instability issues by cracking the fuel prior to introducing it into the combustion chamber. The approach of the present invention takes advantage of the discovery that if fuel enters the combustion chamber as a cracked vapor and not a liquid, then combustion happens rapidly and the droplet vaporization scenario that is the root cause of the instabilities does not occur.

Figure 1:
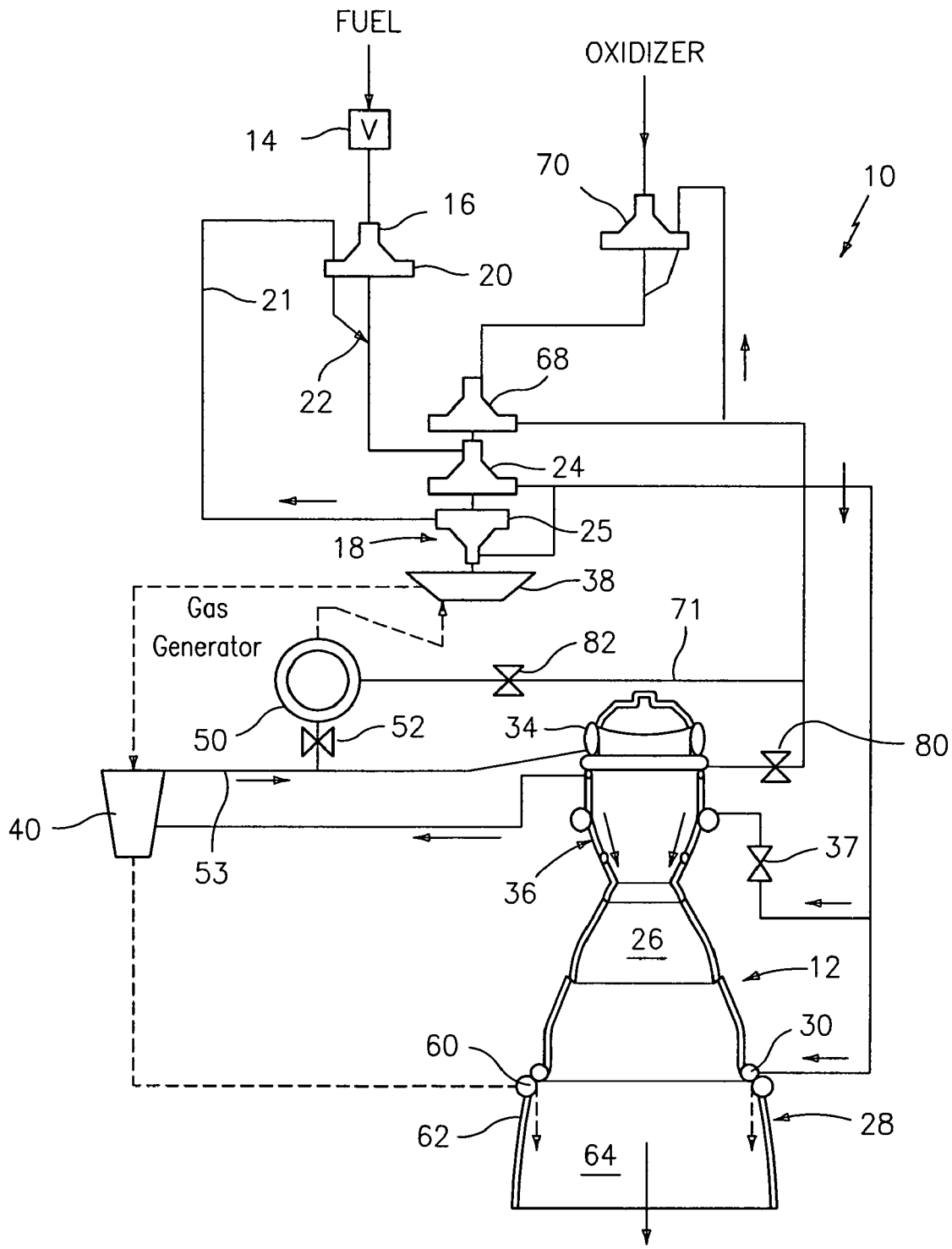
FIG. 1 is a schematic representation of a system for supplying hydrocarbon/oxidizer propellant combinations to a rocket engine.

Referring now to FIG. 1, there is illustrated a system 10 for delivering hydrocarbon/oxidizer propellant combinations, such as a kerosene/LOX combination, to a rocket engine 12. The system 10 uses a cycle which has been designated a Catalytically Enhanced Gas Generator Cycle (CEGG). Using a gas generator (GG) type of cycle reduces the burden in designing a long life turbine and preburner. The GG may be used to produce a gas for driving the turbine; however, unlike a staged combustion cycle, the exhaust from the turbine drive does not get returned to the chamber for combustion. In the CEGG system, the exhaust provides heat to a cracker and then gets exhausted. There are two advantages to this. The first is that the GG can run slightly fuel rich so that the flow can be kept fairly cool. The second advantage is that the pressure ratio across the turbine can be whatever is required to accomplish the power balance and meet turbine efficiency requirements. Therefore, in a system with a Pc of roughly 2500 psia, the GG and the turbine can operate at a much lower pressure. A low temperature and low pressure, non-oxidative environment helps greatly the chances of meeting life requirements for these parts. This approach is inherently safer than a staged combustion cycle that runs at a much higher pressures and temperatures.

After the flow from the GG has been used to drive turbines on the main pump, there is a choice as to how the exhaust is used. The flow can simply be ported overboard. A nozzle can be added at the end to accelerate the flow and add a slight amount of thrust. Aft burning is not possibility; however, if an aft nozzle is a radiation cooled skirt, then the exhaust can be injected as a film layer to help cool the skirt. This reduces the thermal load into the hydrocarbon fuel and should allow for a simple, lower cost nozzle design.

Figure 3:
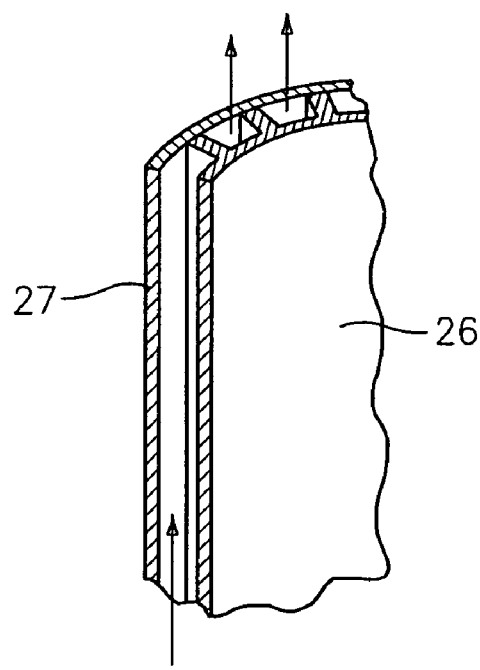
FIG. 3 illustrates a sectional view of the chamber.
Figure 4:
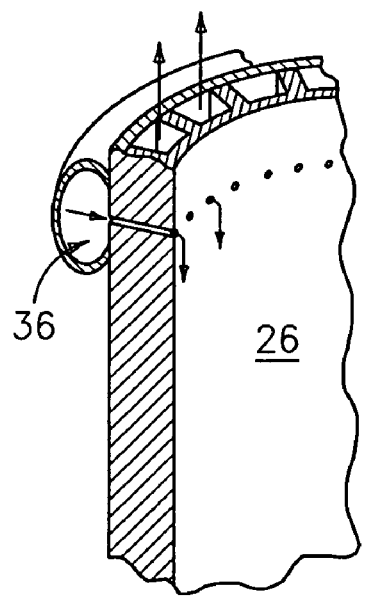
FIG. 4 illustrates a sectional view of the combustion chamber showing the film cooling circuit.

As mentioned above, FIG. 1 shows a schematic of a system 10 employing the CEGG cycle in accordance with the present invention. A hydrocarbon propellant fuel, such as kerosene, enters through a fuel inlet valve (FIV) 14 and enters a fuel boost pump 16. The fuel boost pump 16 raises the fuel pressure to an acceptable level for introduction into the turbopump 18. The fuel boost pump 16 may be driven by a hydraulic turbine 20 which may be powered by a second stage fuel pump flow 21. The turbine discharge from the boost pump 16 is routed into the main fuel flow through a jet pump nozzle 22 to further boost the pressure. The hydrocarbon propellant fuel enters the main pump first stage 24 of the turbopump 18 that raises the pressure, ideally to about 4700 psig. A portion of the hydrocarbon propellant fuel exiting the first stage pump 24 is routed to a second stage fuel pump 25 where the pressure is raised to drive the fuel boost pump 16 and to provide hydraulic power for the actuators that power the thrust vectoring and the motors driving the valves in the propellant lines. The remainder of the flow of hydrocarbon propellant fuel exiting the first stage pump 24 flows to a combustion chamber 26 and nozzle 28 of the rocket engine 12. As shown in FIG. 3, the hydrocarbon propellant fuel flows through channel walls 27 to cool the chamber 26 and the nozzle 28. The flow enters a manifold 30 just above the lower skirt or nozzle section 62 and travels up the assembly towards the injector head 34. As shown in FIG. 4, a separate circuit 36 supplies cool fuel to film cool the inner chamber. A separate valve 37 controls this flow to account for the variation in thrust due to throttling.

Figure 2:
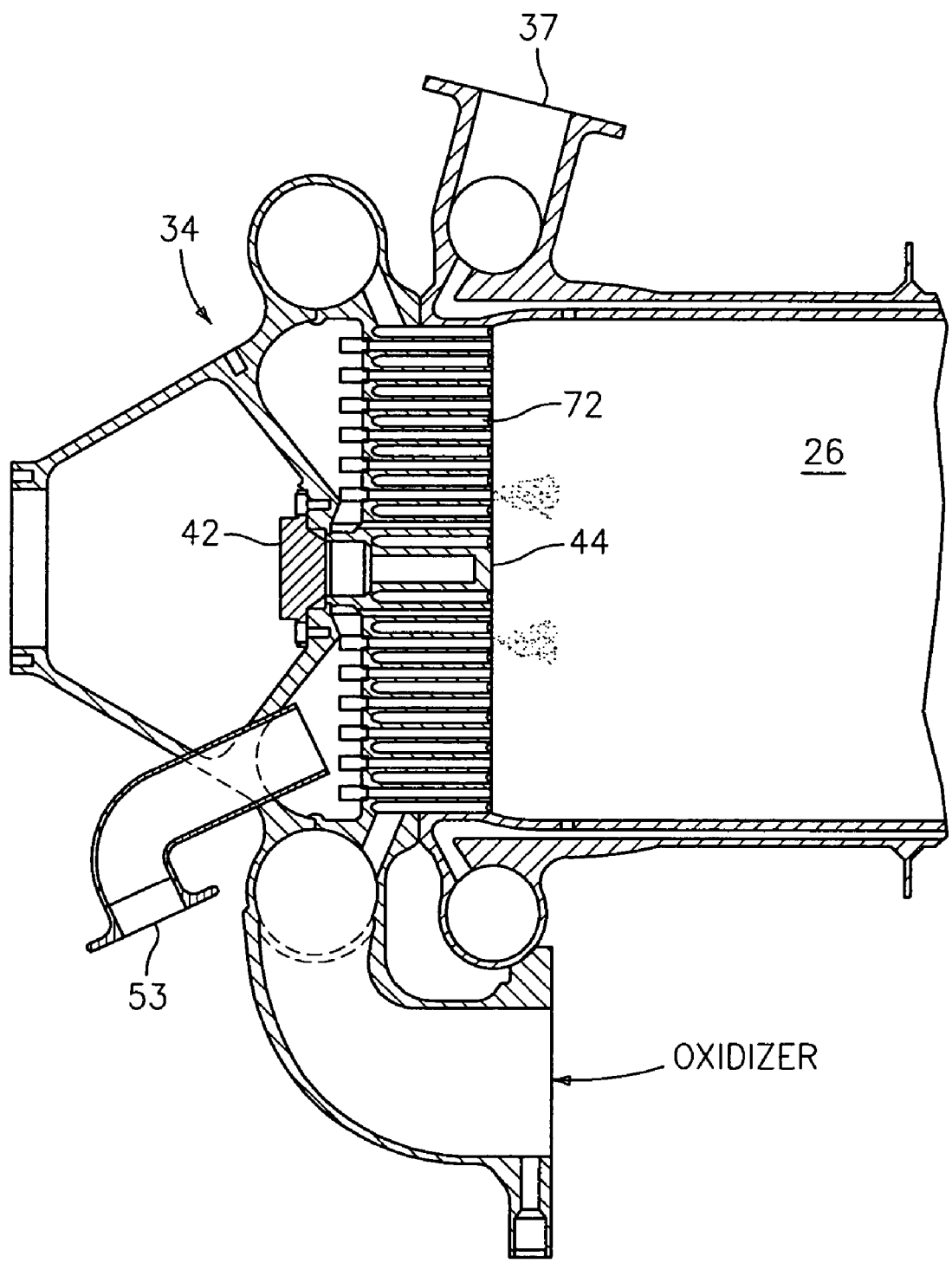
FIG. 2 illustrates a portion of the injector head used in the system of FIG. 1.

The fuel leaves the combustion chamber 26 and the nozzle 28 and is plumbed to a cracker 40 which contains a catalyst that breaks down the hydrocarbon propellant fuel into its constituents hydrocarbons. The catalyst may be any suitable catalyst known in the art which accomplishes this purpose such as the catalyst shown in U.S. Pat. No. 5,232,672. The cracker 40 uses heat from the exhaust of a turbine 38 used to drive the turbopump 18 to help drive the cracking process. The fuel exiting the cracker 40 is a heated liquid that is a conglomeration of hydrocarbons that are above their vapor pressure. Referring now to FIG. 2, the hydrocarbon propellant fuel enters the injector head 34 and travels down the center of a coaxial injector element 42 where it enters the combustion chamber 26. The fuel remains in a liquid like state (above its triple point) until it leaves the tip 44 of the element 42 where it expands and becomes a vapor of lightweight hydrocarbons. It is important to keep carbon particles that precipitated out from the cracking process in the flow stream so they can be carried out the exhaust. Some of the fuel that leaves the cracker 40 is diverted to the GG 50 to provide the energy to drive the turbine 38. A thrust control valve 52 is in the line 53 upstream of the GG 50 to control the fuel flow and therefore turbopump speed and engine thrust. Since the fuel is diverted after the cracker 40, the GG 50 can also use a vaporized fuel for stability in the GG 50, which also has historically had combustion risks.

The exhaust from the GG 50 is used to drive the high-pressure ratio, impulse turbine 38 on the main turbopump 18. The GG 50 is preferably run fuel rich so that the temperature can be kept low enough that no complex coatings or cooling schemes are required to meet life requirements. The turbine flow is then passed through the cracker 40 to provide heat for the cracking process and then routed to a manifold 60 on a lower section 62 of the nozzle 28. At this point, the exhaust flow is cool enough to be used as a film coolant for the lower nozzle section 62. The manifold 60 ejects the flow through angled holes (not shown) to provide thermal protection so that a simple, lightweight exit nozzle section 64 can be used. This will eliminate the need to manufacture a large and complex regenerative nozzle section that has historically been a reliability problem.

The oxidizer system is simple in that an oxidizer, such as LOX, enters the oxidizer boost pump 70 and then the oxidizer pump 68 incorporated into the main turbopump 18. The boost pump 70 may be hydraulically driven but could also be replaced by a jet pump. The oxidizer typically leaves the main turbopump 18 at less than 3000 psig pressure. Some of the oxidizer is routed to the gas generator 50 via line 71 and the main oxidizer control valve 82. The remainder of the oxidizer enters the injector head 34 as a cold liquid and provides coolant to the faceplate 72 as well as be dispersed into the combustion chamber 26 in an outer circuit of the injector element 42. A valve 80 controls the ratio of the fuel/oxidizer mixture. The oxidizer in a lower chamber of the injector head 34 helps to keep the faceplate 72 cool by transpiration cooling. If desired, the oxidizer can be bled through the faceplate 72 using a REGIMESH design. Using the oxidizer in this manner will insure that there are no thermal issues with the faceplate 72 and the life will be greatly improved over an oxidizer rich, staged combustion engine. It also means that coking of the faceplate 72 will not occur during steady state operation or during thermal soak-back conditions.

The cycle used in the system of the present invention allows for an engine design that is a very safe and reliable solution to the problem of making a large, hydrocarbon/oxidizer, such as kerosene/LOX, booster engine for manned space flight.

It is apparent that there has been provided in accordance with the present invention a booster rocket engine using gaseous hydrocarbon in a catalytically enhanced gas generator cycle which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A process for delivering a propellant combination to a rocket engine comprising the steps of:
   providing a flow of a hydrocarbon propellant fuel;
   raising the pressure of said hydrocarbon propellant fuel;
   cracking the hydrocarbon propellant fuel in a cracker;
   introducing the cracked hydrocarbon propellant fuel into a combustion chamber of the rocket engine;
   introducing an oxidizer into said combustion chamber; and
   providing heat from a turbine drive exhaust to help drive the cracking process.

2. A process according to claim 1, wherein said hydrocarbon propellant fuel flow providing step comprises providing a flow of kerosene.

3. A process according to claim 1, wherein said pressure raising step comprises passing said flow of hydrocarbon propellant fuel through a boost pump and then through a first stage of a turbopump.

4. A process according to claim 3, further comprising using a portion of said flow of hydrocarbon propellant fuel to drive a turbine driving said boost pump.

5. A process according to claim 4, further comprising routing said hydrocarbon propellant fuel used to drive said turbine from an exhaust of said turbine into said flow of hydrocarbon propellant fuel via a jet pump nozzle.

6. A process according to claim 1, further comprising using said flow of said hydrocarbon propellant fuel to cool a thrust chamber and a nozzle of said rocket engine prior to introducing said flow of said hydrocarbon propellant fuel to said cracker.

7. A process according to claim 6, wherein said step of using said flow of said hydrocarbon propellant fuel to cool said thrust chamber and said nozzle comprises passing said flow of said hydrocarbon propellant fuel into channel walls and then into a manifold positioned above a lower skirt.

8. A process according to claim 1, further comprising using a portion of said flow of hydrocarbon fuel propellant to film cool the combustion chamber.

9. A process according to claim 1, further comprising using said turbine drive exhaust exiting said cracker to cool a lower section of a nozzle of said engine.

10. A process according to claim 1, wherein said cracked fuel introducing step comprises introducing said cracked fuel in a liquid form into an injector head having a coaxial injector element and allowing said fuel in liquid form to travel down a center of said coaxial injector head and allowing said fuel in liquid form to expand and become a hydrocarbon containing vapor in said combustion chamber.

11. A process according to claim 1, further comprising diverting a portion of said fuel exiting said cracker to a gas generator to provide energy to drive a turbine of a main turbopump.

12. A process according to claim 11, further comprising controlling fuel flow from said cracker and thereby turbopump speed and engine thrust.

13. A process according to claim 1, wherein said oxidizer introducing step comprises passing said oxidizer through a boost pump and then through a main turbopump prior to introducing said oxidizer into an injector head.

14. A process according to claim 13, further comprising a flow of said oxidizer through said injector head to cool a faceplate of said injector head.

15. A process according to claim 13, further comprising diverting a portion of said oxidizer exiting said turbopump to a gas generator.

16. A system for delivering a propellant combination to a rocket engine comprises:
  means for providing a flow of a hydrocarbon propellant fuel;
  means for raising the pressure of the hydrocarbon propellant fuel;
  a cracker for cracking the hydrocarbon propellant fuel;
  means for introducing the cracked hydrocarbon propellant fuel into a combustion chamber of the rocket engine;
  means for introducing an oxidizer into the combustion chamber; and
  means for providing heat from a turbine drive exhaust to help drive the cracking process.

17. A system according to claim 16, wherein said hydrocarbon propellant fuel flow providing means comprises means for providing a flow of kerosene.

18. A system according to claim 16, wherein said pressure raising means comprises a boost pump and a turbopump through which said flow of hydrocarbon propellant fuel flows.

19. A system according to claim 18, further comprising means for using a portion of said flow of hydrocarbon propellant fuel to drive a turbine driving said boost pump.

20. A system according to claim 19, further comprising means for routing said hydrocarbon propellant fuel used to drive said turbine from an exhaust of said turbine into said flow of hydrocarbon propellant fuel via a jet pump nozzle.

21. A system according to claim 16, further comprising means for using said flow of said hydrocarbon propellant fuel to cool a thrust chamber and a nozzle of said rocket engine prior to introducing said flow of said hydrocarbon propellant fuel to said cracker.

22. A system according to claim 21, wherein said means for using said flow of said hydrocarbon propellant fuel to cool said thrust chamber and said nozzle comprises means for passing said flow of said hydrocarbon propellant fuel into channel walls and then into a manifold positioned above a lower skirt.

23. A system according to claim 16, further comprising means for using a portion of said flow of hydrocarbon fuel propellant to film cool the combustion chamber.

24. A system according to claim 16, further comprising means for using said turbine drive exhaust exiting said cracker to cool a lower section of a nozzle of said engine.

25. A system according to claim 16, wherein said cracked fuel introducing means comprises means for introducing said cracked fuel in a liquid form into an injector head having a coaxial injector element, for allowing said fuel in liquid form to travel down a center of said coaxial injector head and for allowing said fuel in liquid form to expand and become a hydrocarbon containing vapor in said combustion chamber.

26. A system according to claim 16, further comprising means for diverting a portion of said fuel exiting said cracker to a gas generator to provide energy to drive a turbine of a main turbopump.

27. A system according to claim 26, further comprising means for controlling fuel flow from said cracker and thereby turbopump speed and engine thrust.

28. A system according to claim 16, wherein said oxidizer introducing means comprises means for passing said oxidizer through a boost pump and then through a main turbopump prior to introducing said oxidizer into an injector head.

29. A system according to claim 28, further comprising means for creating a flow of said oxidizer through said injector head to cool a faceplate of said injector head.

30. A system according to claim 29, further comprising means for diverting a portion of said oxidizer exiting said turbopump to a gas generator.

* * * * *